United States Patent [19]
Bian et al.

[11] Patent Number: 5,789,056
[45] Date of Patent: Aug. 4, 1998

[54] THIN FILM MAGNETIC DISK WITH CHROMIUM-TITANIUM SEED LAYER

[75] Inventors: Xiaoping Bian, San Jose; Mary Frances Doerner, Santa Cruz; Mohammad Taghi Mirzamaani, San Jose; Chon Ngoc Vo, Morgan Hill, all of Calif.

[73] Assignee: International Business Machines Corporation, Armonk, N.Y.

[21] Appl. No.: 791,690

[22] Filed: Jan. 30, 1997

[51] Int. Cl.$^6$ .................................................. G11B 5/66
[52] U.S. Cl. .................. 428/65.3; 428/65.7; 428/336; 428/408; 428/611; 428/666; 428/667; 428/693; 428/698; 428/694 T; 428/694 S; 428/694 TP; 428/694 TC; 428/900
[58] Field of Search .................. 428/694 T, 694 TS, 428/694 TP, 694 TC, 666, 667, 693, 698, 336, 508, 611, 900, 65.3, 65.7

[56] References Cited

U.S. PATENT DOCUMENTS

| | | | |
|---|---|---|---|
| 4,245,008 | 1/1981 | Michaelsen et al. | 428/611 |
| 4,652,499 | 3/1987 | Howard | 428/641 |
| 4,833,020 | 5/1989 | Shiroishi et al. | 428/336 |
| 4,883,711 | 11/1989 | Shiroishi | 428/336 |
| 5,143,794 | 9/1992 | Suzuki et al. | 428/611 |
| 5,147,732 | 9/1992 | Shiroishi et al. | 428/668 |
| 5,314,745 | 5/1994 | Okumura | 428/336 |
| 5,356,522 | 10/1994 | Lal et al. | 204/192.15 |
| 5,456,978 | 10/1995 | Lal et al. | 428/332 |
| 5,482,785 | 1/1996 | Mahvan et al. | 428/611 |

OTHER PUBLICATIONS

"Seed Layer Induced (002) Crystallographic Texture in NiAl Underlayers" J.Appl.Phys. 79(8) 15 Apr. 1996.
"Effects of Cr Intermediate Layers on CoCrPt Thin Film Media on NiAl Underlayers" IEEE Trans. on Magn. vol. 31. No. 6, Nov. 1995.

"Magnetic and Recording Characteristics of Cr, Ta, W and Zr Pre–Coated Glass Disks" IEEE Trans. on Magn. vol. 31. No. 6. Nov. 1995.

"High–coercivity Magnetic Hard Disks Using Glass Substrates" J. Appl. Phys. 67(9) May 1, 1990.

"Magnetic Performance and Tribology of Sputter–Textured Thin Film Disks (Invited)" IEEE Trans. on Magn. vol. 32. No. 5, Sep. 1996.

"Reduction of Co–Cr–Pt Media Noise by Addition of Ti to Cr Underlayer" J.Appl.Phys. 79(8) Apr. 15, 1996.

"Magnetic Properties and Read/Write Characteristics of Co–Cr–(Pt.Ta)/(Cr–Ti.Cr) Thin Film Media" J.Appl. Phys. 73(10), 15 May 1993.

"High coercivity and Low Noise Media Using Glass Substrate" IEEE Trans. on Magn. vol. 30. No.6. Nov. 1994.

Primary Examiner—Leszek Kiliman
Attorney, Agent, or Firm—G. Marlin Knight

[57] ABSTRACT

The present invention describes a disk drive and a thin film magnetic disk with improved recording performance of a magnetic medium having a thin seed layer material consisting of a CrTi alloy between the underlayer and the substrate. The seed layer thickness should be between 5–150Å with 5–30Å being preferable. The percentage of Ti should be greater than 5 at % with recording performance of the magnetic medium improving with increased percentage of Ti. The addition of Ti to Cr, increases the operable thickness range for the seed layer and, thereby, improves the manufacturability.

18 Claims, 2 Drawing Sheets

THIN FILM MAGNETIC DISK WITH CHROMIUM-TITANIUM SEED LAYER

FIELD OF THE INVENTION

This invention relates to the field of data storage devices such as disk drives having thin film magnetic disks. More particularly the invention relates to seed layers for thin film magnetic disks.

BACKGROUND

The magnetic recording disk in a conventional drive assembly typically consists of a substrate, an underlayer consisting of a thin film of chromium (Cr) or a Cr-alloy, a cobalt-based magnetic alloy deposited on the underlayer, and a protective overcoat over the magnetic layer. A variety of disk substrates such as NiP-coated Al—Mg, glass, glass ceramic, glassy carbon, etc., have been used. The microstructural parameters of the magnetic layer, i.e., crystallographic preferred orientation, grain size and magnetic exchange decoupling between the grains, play key roles in controlling the recording characteristics of the disk. The Cr underlayer is mainly used to control such microstructural parameters as orientation and grain size of the cobalt-based magnetic alloy. When the Cr underlayer is deposited at elevated temperature (>150 C.) on a NiP-coated Al—Mg substrate a <100> preferred orientation (PO) is usually formed. This PO promotes the epitaxial growth of (11$\bar{2}$0) of the cobalt (Co) alloy, thereby improving the in-plane magnetic performance of the disk. It is often seen that media fabricated on glass substrates have larger noise compared with those made on NiP-coated Al—Mg substrates under identical deposition conditions. The reason is that the nucleation and growth of Cr or Cr-alloy underlayers on glass and most non-metallic substrates differ significantly from those on NiP-coated Al—Mg substrate. It for this reason that the use of an initial layer on the substrate (hereinafter called the seed layer) has been proposed. The seed layer is formed between the alternate substrate and the underlayer in order to control nucleation and growth of the Cr underlayer and, therefore, the magnetic layers. Several materials have been proposed for seed layers such as: Al, Cr, Ti, Ni$_3$P, MgO, Ta, C, W, Zr, AlN and NiAl on glass and non-metallic substrates. (See for example, Seed Layer induced (002) crystallographic texture in NiAl underlayers, Lee, et al., J. Appl. Phys. 79(8), 15 Apr. 1996, p.4902ff).

In U.S. Pat. 4,833,020 Shiroshi, et al. suggested the use of a wide range of seed layer materials on various substrates including glass to improve the signal to noise ratio and amplitude modulation of the disk. In U.S. Pat. 5,456,978 Lal, et al. suggested the use of a very thin Cr sublayer (seed) on a non-metallic underlayer prior to deposition of the Cr underlayer. The seed layer in their study was 5–50Å thick which should be oxidized by being exposed to air prior to deposition of the Cr underlayer. They have reported improved recording performance when such seed layer was applied.

An effective method to improve the recording performance of a magnetic disk medium is the use of CrTi underlayer, which is proposed by Michealsen, et al. in U.S. Pat. No. 4,245,008. Matsuda, et al. (7) also reported that the addition of Ti to Cr increases the lattice parameters of the Cr to enhance the epitaxial growth of the magnetic layer. (Matsuda, et al., J. Appl. Phys. 79, pp. 5351–53 (1996)). They have also reported that the grain size of CrTi underlayer decreases with increasing the Ti concentration. It should be noted that although sputtered Ti has usually a very small grain size, it is not suitable for use as an underlayer or a seed layer as it promotes the <0001> orientation in the magnetic layer, thereby making it unsuitable for longitudinal recording.

SUMMARY OF THE INVENTION

The present invention describes a thin film magnetic disk (and a disk drive including the magnetic disk) with improved recording performance of a magnetic medium having a thin seed layer consisting of a CrTi alloy between the underlayer and the substrate. The seed layer thickness should be between 5–150Å with below 50Å being preferable. The percentage of Ti should be greater than 5 at % with recording performance of the magnetic medium generally improving with increased percentage of Ti. The addition of Ti to Cr increases the operable thickness range for the seed layer and, thereby, improves the manufacturability.

An underlayer is deposited on top of the seed layer and can be composed of chromium or a chromium alloy with CrTi being preferable. The concentration of Ti in the seed layer, as well as, the underlayer when CrTi is being used, may be modified depending on the magnetic layer composition and the recording density design.

Although the CrTi seed layer yields significantly improved performance on non-metallic substrates, including glass, it can also be used on metallic substrates to reduce the grain size of the underlayer.

DETAILED DESCRIPTION OF THE PREFERRED EMBODIMENT

Figure 1:
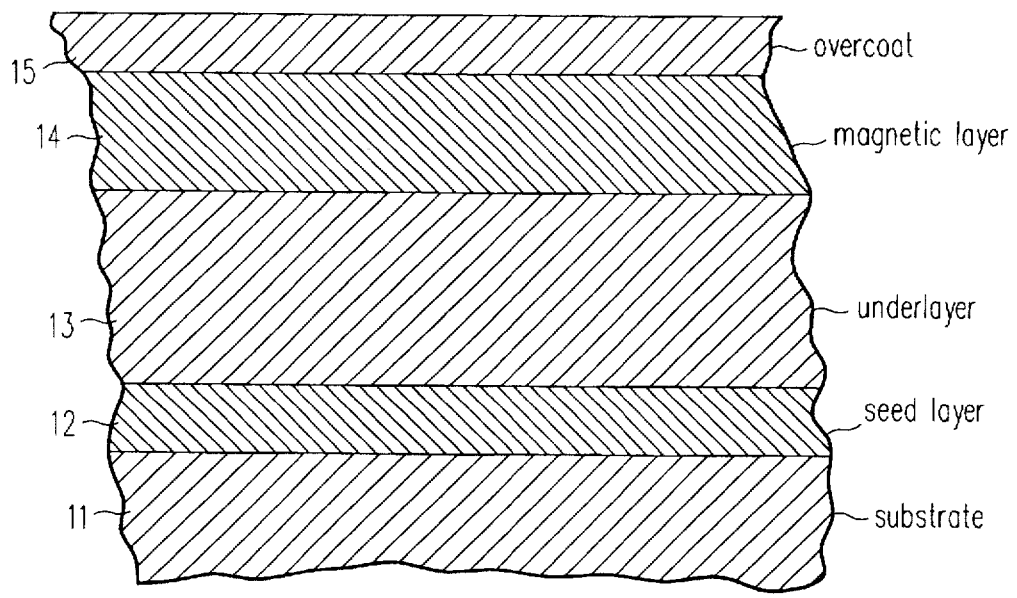
FIG. 1 illustrates the layer structure of a thin film magnetic disk according to the invention.

FIG. 1 illustrates the layer structure of a typical thin film magnetic disk according to the invention. The shading is used only to differentiate the layers and not to indicate color. The substrate 11 is made of glass or a comparable rigid material. The CrTi seed layer 12 is deposited onto the substrate. The underlayer 13 is deposited onto the seed layer. The underlayer is preferably greater than 200Å and is much thicker than the seed layer. The ferromagnetic layer 14 is protected by the overcoat 15. The ferromagnetic layer is typically greater than 100Å while the overcoat is normally less than 150Å. The CrTi seed layer consists of a relatively thin layer with composition of at least 5 atomic percent (at %) Ti and the balance Cr. The thickness should be between 5 and 150Å with 5–50Å being preferable. The seed layer is magnetron sputter deposited using standard targets at relatively high pressure (10–30 mTorr) to promote appropriate (small) nucleation sites for the underlayer. The precise pressure required for a successful sputtering implementation will vary depending on the geometry of the sputtering equipment and other deposition parameters. Unlike the method described in Lal, et al. 5,456,978, there is no need to expose the seed layer to air in order to get the improved performance. The CrTi seed layer provides superior performance of the magnetic disk compared to a pure Cr seed layer.

One measure of merit for a magnetic disk is the signal to noise ratio (SNR). SNR is related to the magnetic grain size and the degree of magnetic coupling between grains in the thin film. The use of the CrTi seed layer improves SNR by reducing the grain size. Table 1 gives magnetic layer (CoPtCrTa) grain size data from Transmission Electron Microscope (TEM) measurements for a Cr75Ti25 seed layer and a Cr90Ti10 underlayer. Since grain size increases with increasing film thickness, it is important to keep the seed layer very thin. The addition of Ti to Cr acts to refine the grain size and allow a thicker seed layer than with pure Cr to be used while maintaining the SNR.

TABLE 1

Magnetic Grain Size from TEM

| Seed Layer Thickness (A) | Grain Size (A) |
| --- | --- |
| 0 | 203 +/− 80 |
| 30 | 138 +/− 45 |
| 130 | 154 +/− 52 |

Figure 2:
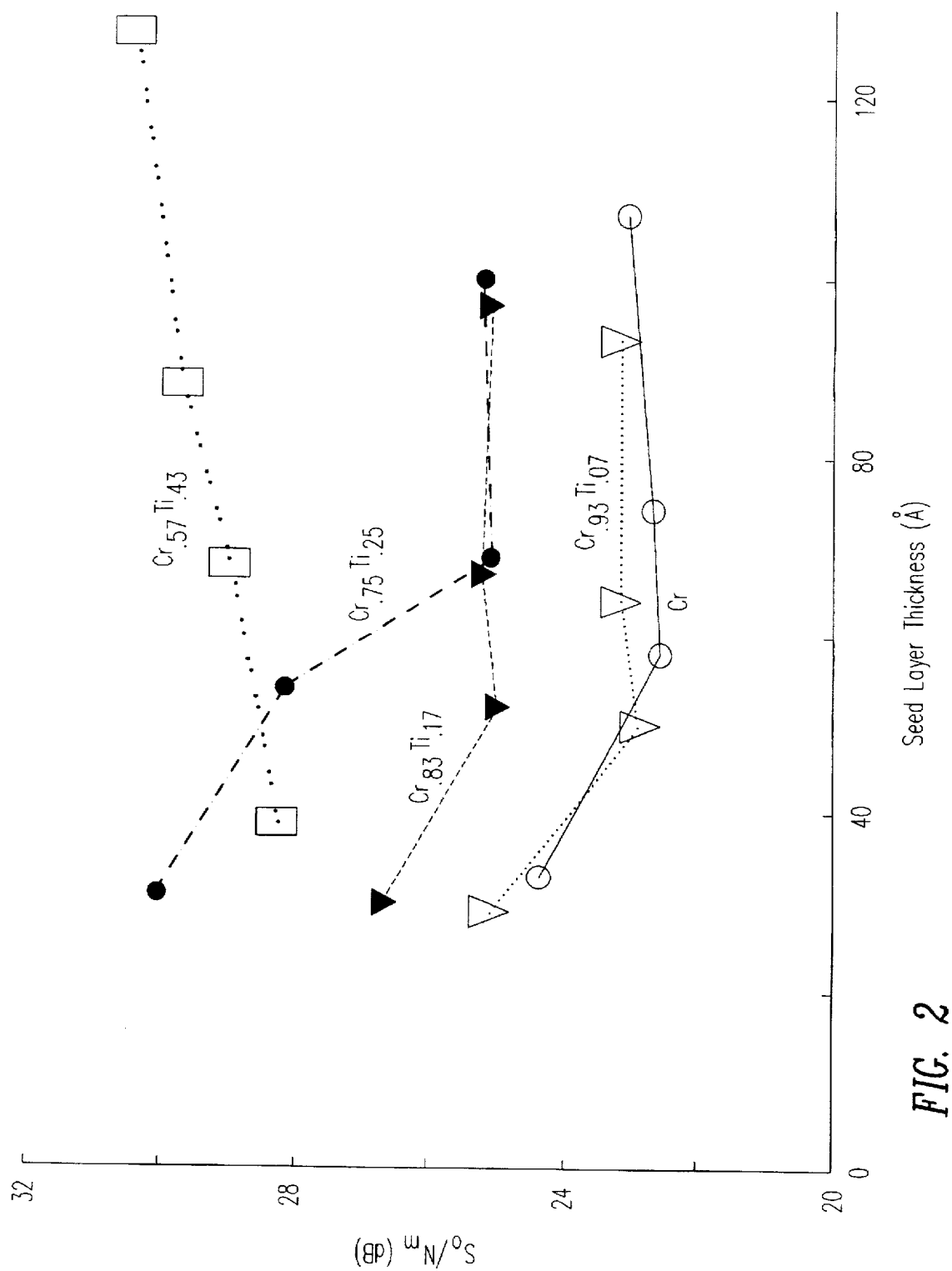
FIG. 2 shows SNR for different compositions of CrTi seed layers for a range of seed layer thickness.

Table 2 contains data on the SNR for different compositions of CrTi seed layers for a range of seed layer thickness. FIG. 2 graphically displays the data. These data are for disks sputtered with Cr90Ti10 underlayers and Co64Pt14Cr22 magnetic layers. As little as 7 at % resulted in a measurable improvement in the SNR. The trend of the data is for SNR to increase with increasing Ti concentration and decreasing seed layer thickness. The opposite thickness behavior is observed for Cr57Ti43 with SNR increasing with seed layer thickness. From the Cr—Ti phase diagram, an intermetallic TiCr$_2$ phase occurs at 36 percent Ti. Therefore, the phases in the seed layer could be different for compositions above 36 percent Ti which could explain the change in behavior. Excellent SNR is achieved for the Cr57Ti43 seed layer demonstrating that compositions of CrTi with Ti greater than 36 percent can still be useful as seed layers. Seed layers with thicknesses above 100Å could be useful in this composition range.

TABLE 2

Subject: Seed layer data

| Seed Layer Thickness (A) | So/Nm (dB) |
| --- | --- |
| Seed Layer Composition: Cr | |
| 33 | 24.4 |
| 58 | 22.6 |
| 74 | 22.7 |
| 107 | 23.1 |
| Seed Layer Composition: Cr93Ti7 | |
| 29 | 25.1 |
| 50 | 22.9 |
| 64 | 23.2 |
| 93 | 23.2 |
| Seed Layer Composition: Cr83Ti17 | |
| 30 | 26.7 |
| 52 | 25.0 |
| 67 | 25.2 |
| 97 | 25.1 |
| Seed Layer Composition: Cr75Ti25 | |
| 31 | 30.1 |
| 54 | 28.2 |
| 69 | 25.1 |
| 100 | 25.2 |
| Seed Layer Composition: Cr57Ti43 | |
| 39 | 28.3 |
| 68 | 29.0 |
| 88 | 29.7 |
| 127 | 30.4 |

Underlayers which can be successfully used with CrTi seed layers include Cr, CrV alloys with V ranging from 0 . 50% and CrTi alloys with Ti ranging from 0–30%. The underlayer composition should be chosen with the magnetic layer in mind according to known prior art principles. Since Ti expands the Cr lattice, optimum lattice parameter matching between the Cr-alloy and Co-alloy magnetic layer is not necessarily achieved at the higher Ti concentrations that are preferred for the seed layer.

The magnetic layers which are useful with the CrTi seed layer include ternary CoPtCr and quaternary CoPtCrTa compositions although other alloys such as CoNiCr or CoCrTa could also be used. To obtain maximum SNR, ternary CoPtCr alloys with Cr greater than 20 atomic percent or CoPtCrTa alloys with Cr greater than 18 atomic percent are preferred. Typical compositions would be Co64Pt14Cr22 or Co69Pt10Cr18Ta3.

While the compositions listed above have been given without regard to contamination percentages, it is know to those skilled in the art that some contamination is normally if not always present in thin films. For example, contamination by air in the chambers might result in measurable amounts of oxygen and/or hydrogen being incorporated into the film. For some films 5 at. % hydrogen contamination has been measured in a typical sputtered layer. The targets are an additional source of contamination. A typical purity specification for a sputtering target is 99.99%.

The thin film disk made according to the invention can be used for storing data in typical disk drives using either magnetoresistive or inductive heads and can be used in contact recording or with flyable heads. The read/write head is positioned over the rotating disk in the standard manner to either record or read data.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:
   a substrate;
   a seed layer deposited on the substrate between 5 and 150Å in thickness comprising chromium and at least 5 at. % titanium;
   an underlayer including chromium and having a thickness greater than the thickness of the seed layer; and
   a magnetic layer formed in grains having an average size less than 203Å.

2. The disk of claim 1 wherein the magnetic layer comprises cobalt, platinum and at least 18 at. % chromium.

3. The disk of claim 1 wherein the substrate comprises a non-metallic material.

4. The disk of claim 1 wherein the seed layer is an intermetallic phase of chromium and titanium.

5. The disk of claim 1 wherein the seed layer contains from 17 to 45 at % titanium.

6. The disk of claim 1 wherein the seed layer is between 30 and 125Å in thickness.

7. The disk of claim 1 wherein the substrate comprises a non-metallic material, and the seed layer is between 30 and 125Å in thickness and contains between 15 and 45 at % titanium.

8. The disk of claim 1 wherein the substrate comprises a metallic material, and the seed layer is between 30 and 125Å in thickness and contains between 15 and 45 at % titanium.

9. The disk of claim 1 wherein the underlayer comprises Cr, CrV alloys and CrTi alloys.

10. A disk drive comprising:

a thin film magnetic disk including:
   a substrate;
   a seed layer deposited on the substrate between 5 and 150Å in thickness comprising chromium and at least 5 at. % titanium;
   an underlayer including chromium and having a thickness greater than the thickness of the seed layer; and
   a magnetic layer formed in grains having an average size less than 203Å;
means for rotating the thin film magnetic disk;
a read/write head; and
means for positioning the read/write head over the thin film magnetic disk.

11. The disk of drive of claim 10 wherein the magnetic layer comprises cobalt, platinum and at least 18 at. % chromium.

12. The disk drive of claim 10 wherein the substrate comprises a non-metallic material.

13. The disk drive of claim 10 wherein the seed layer is an intermetallic phase of chromium and titanium.

14. The disk drive of claim 10 wherein the seed layer contains from 17 to 45 at % titanium.

15. The disk drive of claim 10 wherein the seed layer is between 30 and 125Å in thickness.

16. The disk drive of claim 10 wherein the substrate comprises a non-metallic material, and the seed layer is between 30 and 125Å in thickness and contains greater 15 at % titanium with the remainder being predominantly Cr.

17. The disk drive of claim 10 wherein the underlayer comprises Cr, CrV alloys or CrTi alloys.

18. A thin film disk comprising:
   a rigid non-metallic substrate;
   a seed layer deposited on the substrate, the seed layer being from 5 to 125Å thick and consisting essentially of chromium and titanium with titanium being from 17 to 43 atomic percentage;
   an underlayer deposited on the seed layer, the underlayer being thicker than the seed layer and including chromium; and
   a cobalt alloy magnetic layer deposited on the underlayer, the magnetic layer formed in grains having an average size less than 203Å.

* * * * *